(12) United States Patent
Liu

(10) Patent No.: US 6,848,911 B1
(45) Date of Patent: Feb. 1, 2005

(54) ROTATABLE SHUNTING SOCKET HOUSING FOR TELECOMMUNICATION DEVICES

(75) Inventor: Fabian Liu, Taipei (TW)

(73) Assignee: Tsay-E International Inc., Taipei (TW)

( * ) Notice: Subject to any disclaimer, the term of this patent is extended or adjusted under 35 U.S.C. 154(b) by 0 days.

(21) Appl. No.: 10/622,317

(22) Filed: Jul. 18, 2003

(51) Int. Cl.[7] .............................................. H01R 39/00
(52) U.S. Cl. .......................................... 439/22; 439/21
(58) Field of Search ............................. 439/11, 13, 27, 439/29, 17–22, 638, 676; 174/50, 53, 135

(56) References Cited

U.S. PATENT DOCUMENTS 4,362,905 A * 12/1982 Ismail ........................ 379/442
5,082,448 A * 1/1992 Kang ........................... 439/22

* cited by examiner

Primary Examiner—Alex Gilman
(74) Attorney, Agent, or Firm—Dellett & Walters

(57) ABSTRACT

A rotatable shunting socket housing for telecommunication devices includes a body having two sockets respectively defined at two opposite side thereof. Each of the sockets is provided with a plurality of metal feet. A cover is mounted on a side of the body and between the sockets. A connector is rotatably mounted on the cover, and has a plug provided at an exterior side thereof. The plug is perpendicular to the sockets and electrically connected with the metal feet. The body and the cover can be rotated about the connector, and plugs of mounting cords inserted in the can be parallel to a wall, so that the mounting cords are not bent or twisted.

6 Claims, 4 Drawing Sheets

ROTATABLE SHUNTING SOCKET HOUSING FOR TELECOMMUNICATION DEVICES

BACKGROUND OF THE INVENTION

1. Field of the Invention

The present invention is related to a shunting socket housing for telecommunication devices, and more particularly to a shunting socket housing rotatable to change an orientation of sockets in the housing.

2. Description of Related Art

A telecommunication device, such as a telephone, generally has a first cord leading from it into a socket housing fixed on a wall, and a second cable extends out from the socket housing to a national telephone grid. In this way, the house or office many have many such sockets whereby a telephone can be moved to the most suitable position at a given time. Two sockets are respectively provided at opposite ends of the housing and these sockets have a longitudinal axis parallel to the wall. Each of the cords has a plug securely receivable in the respective socket. However, the first cord in particular is not parallel to the wall and so it must be bent to extend in the direction of the telephone and it is found that such a bend is harmful to optimum transmission of signals to the telephone.

Therefore, the invention provides a rotatable shunting socket housing for telecommunication devices to mitigate and/or obviate the aforementioned problems.

SUMMARY OF THE INVENTION

The main objective of the invention is to provide a shunting socket housing for telecommunication devices of which sockets are perpendicular to a wall and an orientation of the sockets can be changed.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
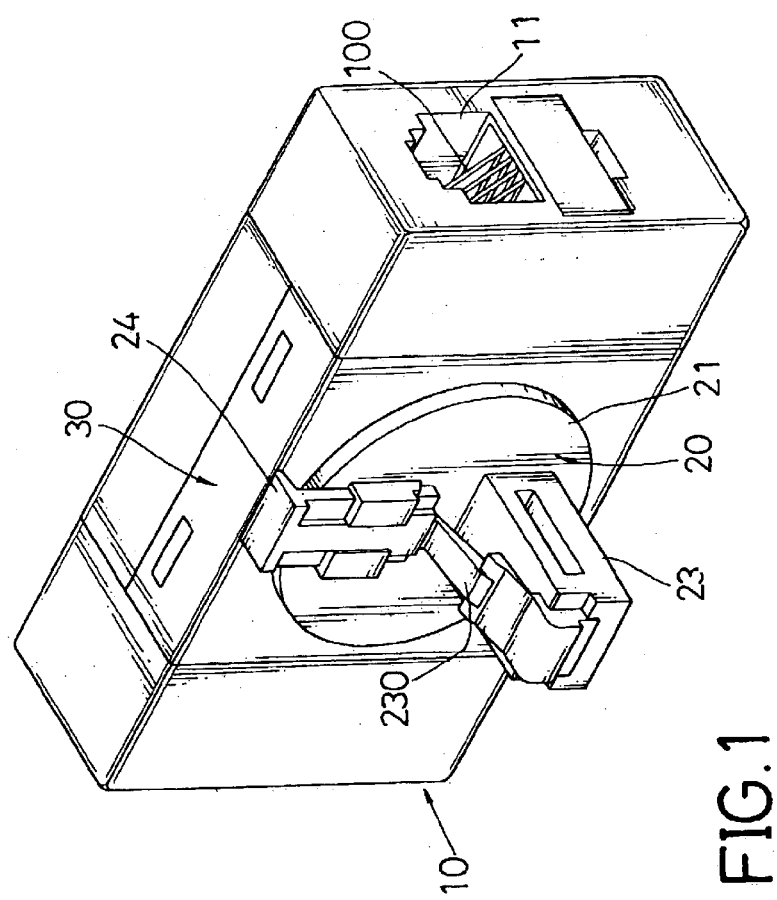
FIG. 1 is a perspective view of a rotatable shunting socket housing for telecommunication devices in accordance with the invention.
Figure 2:
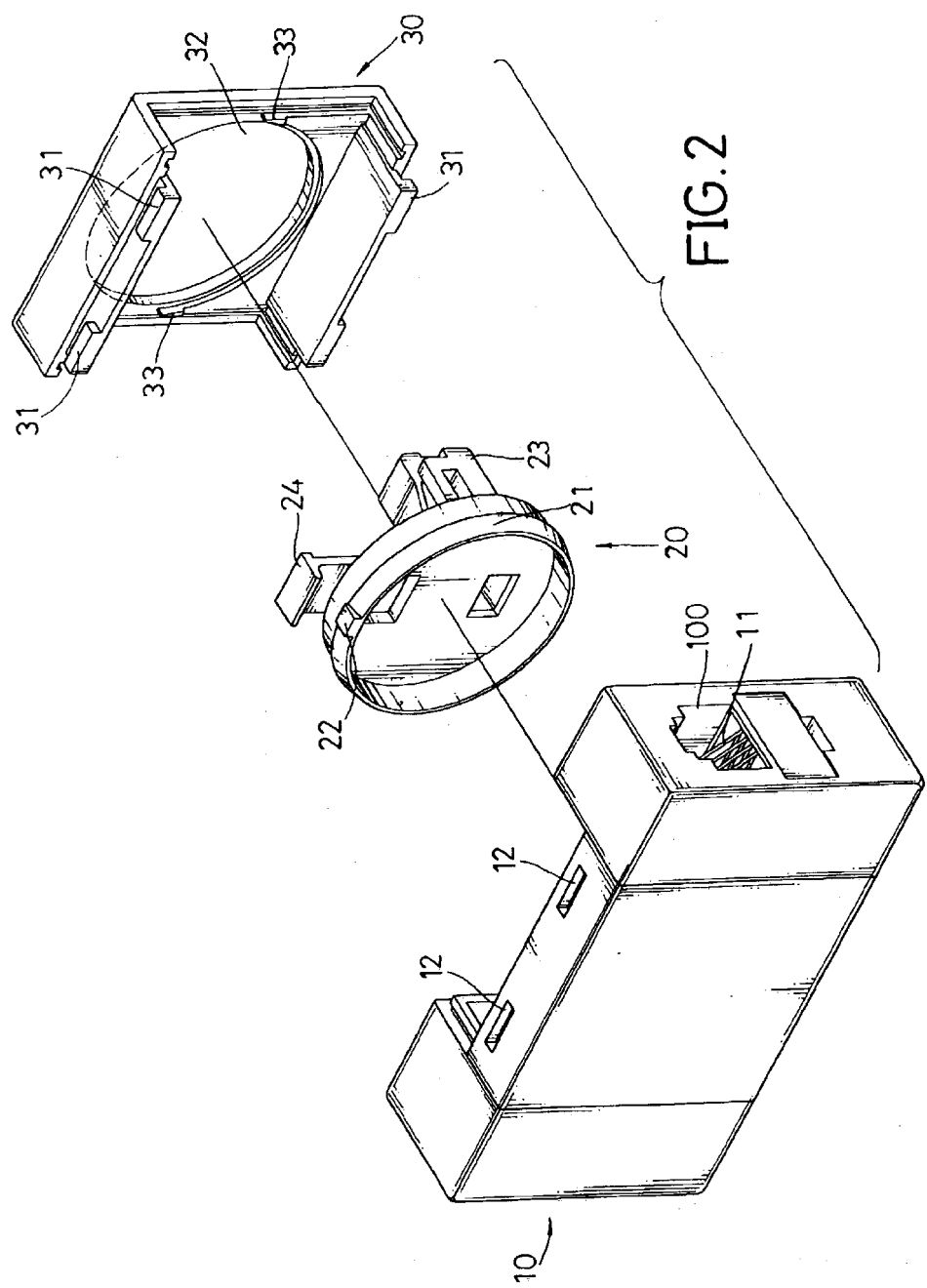
FIG. 2 is an exploded perspective view of the shunting socket housing of FIG. 1.

Referring to FIGS. 1–2, a shunting socket housing for telecommunication devices in accordance with the present invention is composed of a body (10), a connector (20), and a cover (30).

The body (10) has two sockets (100) respectively defined at two opposite sides thereof. Each of the sockets (100) is provided with a plurality of metal feet (11) for electrical connection with a plug of a mounting cord. A plurality of slots (12) is defined through an upper side and a lower side of the body (10).

The cover (30), with a U-like cross section, has a plurality of tongues (31) formed at an upper side and a lower side thereof and received in the respective slots (12) to fasten the cover (30) on the body (10). A circular opening (32) is defined through an upright side of the cover (30) between the upper and lower sides. Two stops (33) are formed at two diametrically opposite sides of the circular opening (32).

The connector (20) has a ring (21) formed at an interior side thereof and rotatably received in the circular opening (32). A protrusion (22) is formed at a circumference of the ring (21) and located between the stops (33). A plug (23) with a clip (230) is provided at an exterior side of the rotatable connector (20) and perpendicular to the sockets (100). A movable block (24) is provided at a distal end of the clip (230). The connector (20) is electrically connected with the metal feet (11) in the sockets (100).

Figure 3:
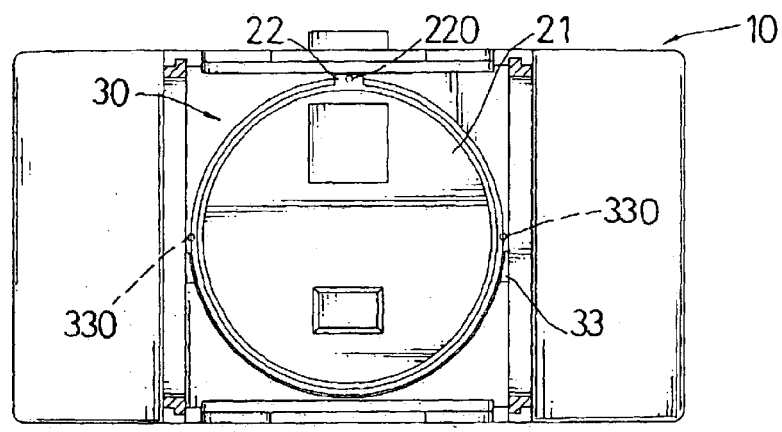
FIG. 3 is a front sectional view of the shunting socket housing of FIG. 1.

Referring to FIG. 3, the cover (30) further has two recesses (330) respectively defined above the stops (33), and the protrusion (22) further has a lug (220) formed at a side facing the recesses (330). When the protrusion (22) is blocked by one of the stops (33), the lug (220) can be received in the corresponding recess (330).

Figure 4:
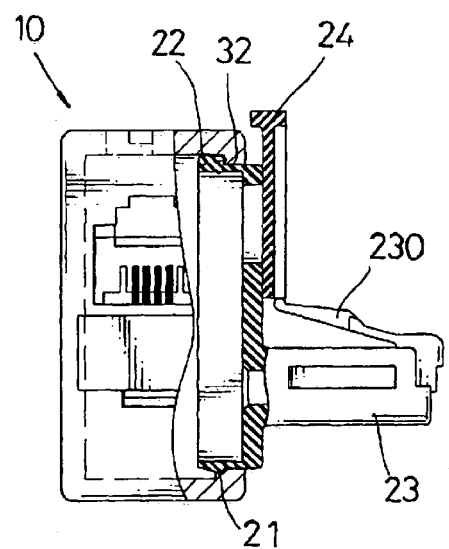
FIG. 4 is a side partially sectional view of the shunting socket housing.

Referring to FIG. 4, the plug (23) can be engaged in a socket on a wall and secured by the clip (230) to fasten the shunting socket housing. When the movable block (24) is pressed downwards, the plug (23) can be disengaged from the socket and the shunting socket housing can be detached from the wall.

Figure 6:
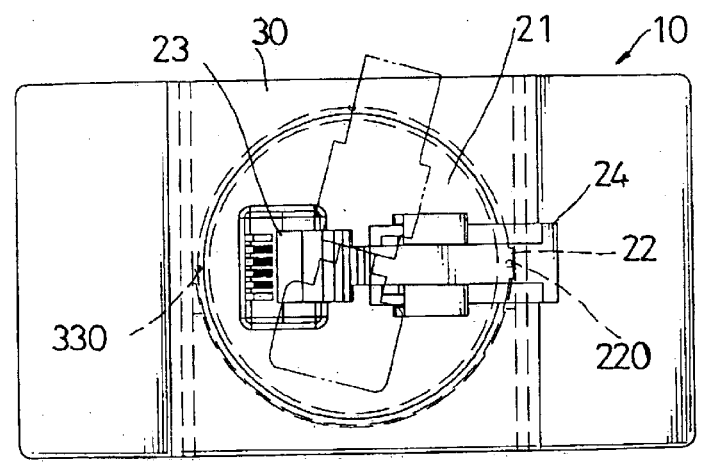
FIG. 6 is a schematic front view of the shunting socket housing in a status that a body of the shunting socket is rotated 90 degrees about a connector.
Figure 5:
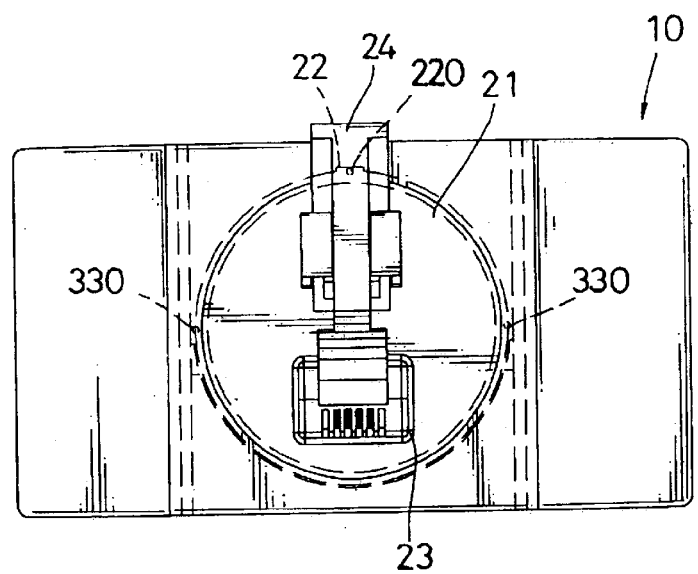
FIG. 5 is a schematic front-view of the shunting socket housing installed on a wall.

Referring to FIGS. 1, 5 and 6, when the cover (30) is rotated about the ring (21) of the connector (20), the body (10) can be turned clockwise or counter-clockwise in an extent of 90 degrees until the protrusion (22) is blocked by the stops (33). Thus, the sockets (100) can be in a horizontal position. Because the sockets (100) are perpendicular to the wall, plugs of mounting cords inserted in the sockets (100) can be parallel to the wall, so that the mounting cords are not bent or twisted and the transmission of signals will not be interrupted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rotatable shunting socket housing for telecommunication devices comprising:
    a body having two sockets respectively defined at two opposite sides of the body, each socket having a plurality of metal feet provided in the sockets;
    a cover mounted on a side of the body between the sockets, wherein the cover as a circular opening defined through an upright side between the sockets and a ring formed at an interior side of the connector and rotatably received in the circular opening, and
    a connector rotatably mounted on the cover, the connector having a plug provided at an exterior side of the connector and perpendicular to the sockets and electrically connected with the metal feet, wherein the cover has two stops formed at diametrically opposite sides of the circular opening, and the connector has protrusion formed on a circumference of the ring and located between the stops.

2. The rotatable shunting socket housing as claimed in claim 1, wherein the cover further has two recesses respectively defined above the stops, and the protrusion further has a lug formed at a side facing the recesses for being positioned in the corresponding recess when the protrusion abuts one of the stops.

3. The shunting socket housing as claimed in claim 1, wherein the body has a plurality of slots defined through an upper side and a lower side of the body and between the sockets, and the cover has a plurality of tongues form at an upper side and a lower side of the cover and positioned in the respective slots to fasten the cover on the body.

4. The shunting socket housing as claimed in claim 1, wherein the protrusion has a lug formed at a side thereof to be selectively received in a corresponding one of recesses defined in the stops.

5. The shunting socket housing as claimed in claim 3, wherein the protrusion has a lug formed at a side thereof to be selectively received in a corresponding one of recesses defined in the stops.

6. A rotatable shunting socket housing for telecommunication devices comprising:

a body having two sockets respectively defined at two opposite sides of the body, each socket having a plurality of metal feet provided in the sockets;

a cover mounted on a side of the body between the sockets, and a connector rotatably mounted on the cover, the connector having a plug provided at an exterior side of the connector and perpendicular to the sockets and electrically connected with the metal feet, wherein the body has a plurality of slots defined through an upper side and a lower side of the body and between the sockets, and the cover has a plurality of tongues form at an upper side and a lower side of the cover and positioned in the respective slots to fasten the cover on the body.

* * * * *